(12) United States Patent
Wang

(10) Patent No.: US 10,054,275 B2
(45) Date of Patent: Aug. 21, 2018

(54) LIGHTING APPARATUS

(71) Applicant: Quanzhou Viition Gifts Co., LTD, Fujian Province (CN)

(72) Inventor: Peijun Wang, Fujian Province (CN)

(*) Notice: Subject to any disclaimer, the term of this patent is extended or adjusted under 35 U.S.C. 154(b) by 90 days.

(21) Appl. No.: 15/008,456

(22) Filed: Jan. 28, 2016

(65) Prior Publication Data

US 2017/0016599 A1   Jan. 19, 2017

(30) Foreign Application Priority Data

Jul. 16, 2015   (CN) .......................... 2015 1 0418380

(51) Int. Cl.
| | |
|---|---|
| *F21S 9/03* | (2006.01) |
| *F21W 121/00* | (2006.01) |
| *F21S 8/06* | (2006.01) |
| *F21S 10/02* | (2006.01) |
| *F21S 10/06* | (2006.01) |
| *F21V 7/00* | (2006.01) |
| *F21V 21/08* | (2006.01) |
| *F21Y 115/10* | (2016.01) |

(52) U.S. Cl.
CPC .............. *F21S 9/03* (2013.01); *F21S 8/061* (2013.01); *F21S 10/02* (2013.01); *F21S 10/06* (2013.01); *F21V 7/0016* (2013.01); *F21V 21/08* (2013.01); *F21V 21/0824* (2013.01); *F21W 2121/00* (2013.01); *F21Y 2115/10* (2016.08); *Y02B 20/72* (2013.01)

(58) Field of Classification Search
None
See application file for complete search history.

(56) References Cited

U.S. PATENT DOCUMENTS

| | | | | |
|---|---|---|---|---|
| 2013/0265750 | A1* | 10/2013 | Pickard ................. | F21V 21/088 362/184 |
| 2013/0335953 | A1* | 12/2013 | Gold ....................... | F21L 15/08 362/158 |

* cited by examiner

*Primary Examiner* — Thomas M Sember
(74) *Attorney, Agent, or Firm* — Prakash Nama; Global IP Services, PLLC

(57) ABSTRACT

The present invention discloses a lighting apparatus which includes a body and a lighting assembly. The lighting assembly includes a mounting frame and a light-emitting body disposed thereon. The body is in an atypical shape or a polyhedron shape. A surface of the body protrudes or is recessed to form a chamber. The light-emitting body is provided inside and/or outside the chamber, and/or inside and/or outside the body. The present invention utilizes the shape features of the body to create a harmonious, unified and perfect effect in combination of the environment in which it is used. The basin-shaped body is placed outdoors. Water and bird food can be held in the basin. In daytime, the light-emitting body does not light up. Birds can clean their feathers and peck at the bird food in the basin, which is environmentally friendly and energy saving.

8 Claims, 12 Drawing Sheets

LIGHTING APPARATUS

BACKGROUND OF THE INVENTION

The present invention relates to a lighting apparatus and more particularly pertains to a lighting apparatus which is both aesthetically pleasing and practical.

Conventional lighting apparatus with single function are mostly used for lighting. With the trend towards a diversified and personalized life, lighting apparatus used in environment such as indoor and outdoor and courtyard have also increased. These lighting apparatus have to satisfy the decorative need, and sealability has to be taken into consideration when used outdoors. Thus, the structure of a lighting component and location where it will be placed are particularly important. In addition, the lamp beads used in the lighting apparatus are in one single color. The lighting effect produced is monotonous. It cannot be fully blended into the environment in which it is used.

BRIEF SUMMARY OF THE INVENTION

In view of the aforesaid disadvantages now present in the prior art, the present invention aims to provide a lighting apparatus with simple structure.

To attain this, the technical solution of the present invention is as follows:

A lighting apparatus comprises a body and a lighting assembly. The lighting assembly comprises a mounting frame and a light-emitting body. The light-emitting body is provided on the mounting frame. The body is in an atypical shape or a polyhedron shape. A surface of the body protrudes or is recessed to form a chamber. The light-emitting body is provided inside and/or outside the chamber, and/or inside and/or outside the body.

The body is basin-shaped. A bottom of the body protrudes or is recessed to form the chamber; at least part of a chamber wall of the chamber forms a first luminous body which is light reflective or light refractive. The first luminous body is in an atypical shape or a polyhedron shape; the first luminous body is made into a first translucent body with light-penetrative materials, or is made into a first refractive body with light-reflective materials.

The light-emitting body comprises multiple lamp beads. The multiple lamp beads are monochromatic or multicolor respectively. The lamp beads are provided inside, on a side of, above and/or below the mounting frame respectively. Light of the lamp beads at a top surface is emitted upwards. Light of the lamp beads on the side is emitted upwards or downwards. Light of the lamp beads at a bottom surface is emitted downwards.

A stand for supporting the lighting apparatus is formed at the bottom of the body. The bottom of the mounting frame is provided with a planar, ribbed or an arc shaped light diffuser plate, which is higher than the stand.

The lighting apparatus also comprises a second luminous body. The second luminous body is in an atypical shape or a polyhedron shape. The second luminous body is provided outside the chamber corresponding to the light-emitting body; the second luminous body is made into a second translucent body with light-penetrative materials, or is made into a second refractive body with light-reflective materials.

The chamber wall of the chamber is recessed to form a mounting base; the second luminous body is provided on the mounting base in a removable or fixed manner; or is provided above and/or below the chamber in a removable or fixed manner; or a through hole is provided on the body, the chamber, the mounting base, the first luminous body and/or the second luminous body.

A ratio of a projected area of the first luminous body to a projected area of the body is 0.2-0.6, and/or a ratio of a projected area of the second luminous body to the projected area of the body is 0.1-0.6, and/or a ratio of the projected area of the second luminous body to the projected area of the first luminous body is 0.1-3.

The lighting apparatus also comprises a power which provides electricity for the luminous body; the power is provided inside or outside the body, or is provided on the mounting frame; the power electrically connects to the luminous body through an interface, or electrically connects to the luminous body by a wire which passes through the through hole.

The lighting apparatus also comprises a solar cell chip which provides electricity for the luminous body; the solar cell chip is provided inside or outside the body, or is provided at the top surface, on the side and/or at the bottom surface of the mounting frame; or the solar cell chip and the luminous body are spaced at intervals and provided on the mounting frame.

An inner surface of the first luminous body and/or the second luminous body is scale-like, honeycomb-like or in a gemstone cut shape; or a surface of the first luminous body and/or the second luminous body is hollowed out; or the first luminous body and/or the second luminous body has one or more than two refractive indices.

After adopting the above structure, the lighting apparatus of the present invention has the following the following advantages:

1. By placing the luminous body in the chamber formed by protrusion or recess of the body, not only is the structure simple, but the shape features of the body can be fully utilized to create a harmonious, unified and perfect effect in combination of the environment in which it is used.

2. By setting the mounting position of LED lamp beads, illumination angle and ratios of the projected areas among the body, the first luminous body and the second luminous body so that the light emitted from the LED lamp beads is refracted, reflected and scattered in multiple angles and multiple directions, not only can the brightness and area of illumination at the bottom of the body be increased, but the brightness and area of illumination in all sides of the body can also be increased, so that the body achieves a night view decorative effect which is gorgeous and perfectly clear and bright.

The lamp beads are monochromatic or multicolor, which can produce a variety of lighting effects depending on the application. They can be fully blended into the environment in which they are used and are both aesthetically pleasing and practical.

Figure 1:
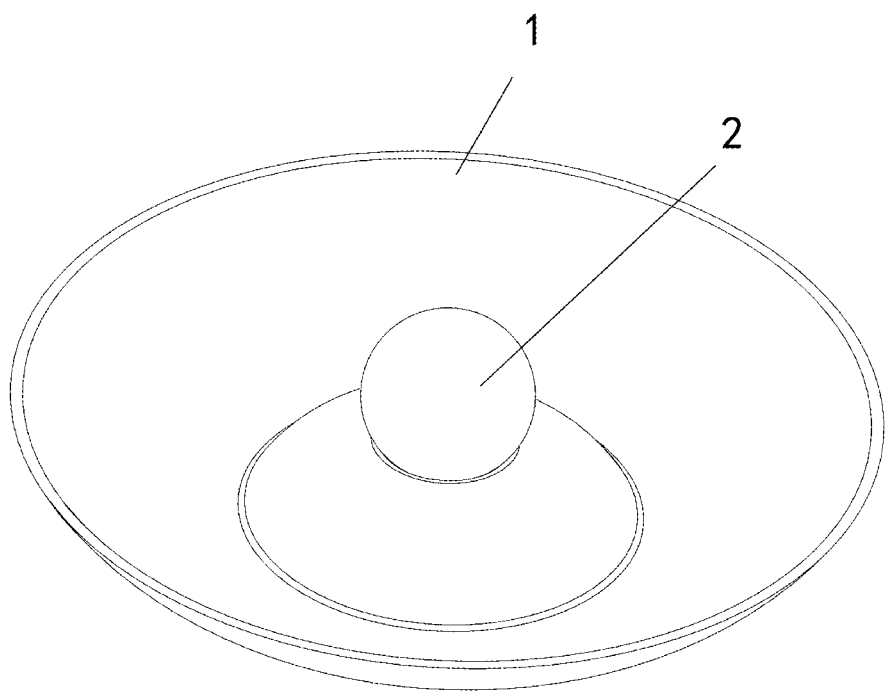
FIG. 1 is a perspective view of the lighting apparatus of the present invention.

| Body | 1 | Chamber | 11 |
| First luminous body | 111 | Mounting base | 112 |
| Stand | 113 | Lighting assembly | 2 |
| Light-emitting body | 21 | Solar cell chip | 22 |
| Mounting frame | 23 | Flange | 231 |
| Light diffuser plate | 24 | Recess | 241 |
| Access port | 242 | Second luminous body | 25 |
| First connecting piece | 26 | First connecting piece | 26' |
| Second connecting piece | 27 | Flanged edge | 271 |
| Interface | 28 | Through hole | 29 |
| Wire | 30 | | |

DETAILED DESCRIPTION OF THE INVENTION

To further explain the technical proposal of the present invention, the present invention will be described in detail with reference to the embodiments below.

As illustrated in FIGS. 1 to 11, the lighting apparatus of the present invention mainly comprises a body 1 and a lighting assembly 2. The lighting assembly 2 comprises a light-emitting body 21 and a mounting frame 23.

The body 1 is in a polyhedron shape of or an atypical shape, such as a basin shape, a dish shape, a barrel shape or other planar or three-dimensional shape. The body 1 forms a chamber 11 in the interior or on the surface based on its specific shape. For example, when the body 1 is in a basin shape, a dish shape or a barrel shape, a bottom or a bottom surface of the body 1 protrudes or is recessed to form the chamber 11. The chamber 11 is in a polyhedron shape or an atypical shape. A light-emitting body 21 is placed in the chamber 11. The chamber 11 forms multiple folded surfaces, resulting in different refractive indices. When the body 1 is in the shape of an animal, a human figure or a cartoon character, the chamber 11 can be formed on top of or on the side of the body 1 by protruding inwards or outwards.

Further, the body 1 is integrally molded into a basin shape by the use of light-penetrative materials, or the chamber 11 is located at the center of the bottom of the body 1 as far as possible. At least part of the chamber wall of the chamber 11 forms a first luminous body 111 which is light reflective or light refractive. The first luminous body 111 can be formed into a dome shape or a polyhedron shape by bottom of the body 1 recessing inwards. Thus, the light produced by the light-emitting body 21 turns the first luminous body 111 into a light-emitting light package. Since the first luminous body 111 is made into a first translucent body with light-penetrative materials, the resulting light passes through the first translucent body from inside to outside or from outside to inside, thus producing a variety of light changes such as refraction and diffused reflection and achieving a luminous effect. The first luminous body 111 can also be made into a first refractive body with light-reflective materials. Thus, the first refractive body can reflect external light, which can also achieve a luminous effect.

Figure 2:
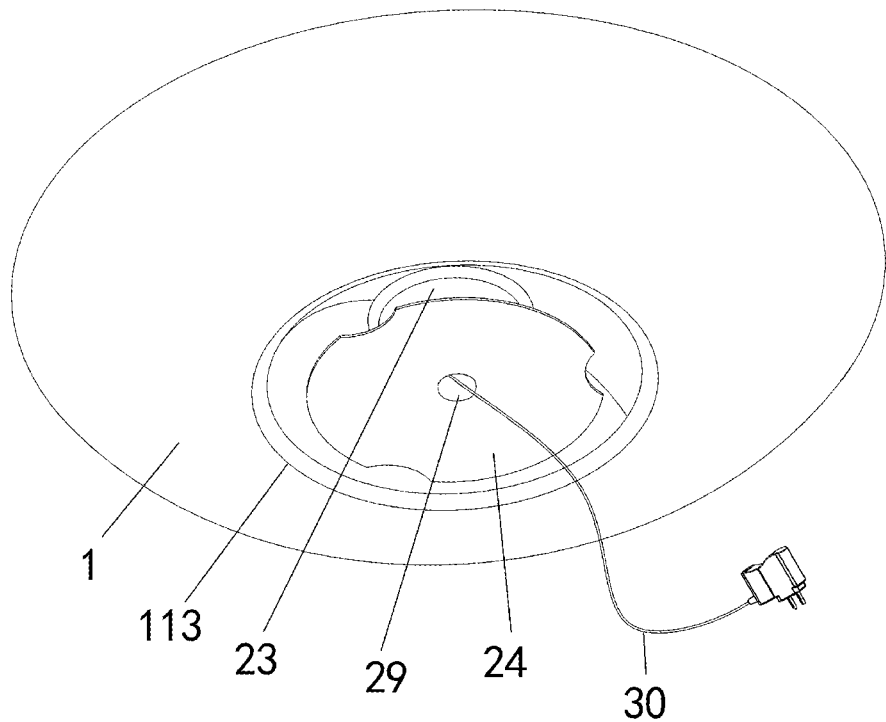
FIG. 2 is a bottom view 1 of the lighting apparatus of the present invention.
Figure 2A:
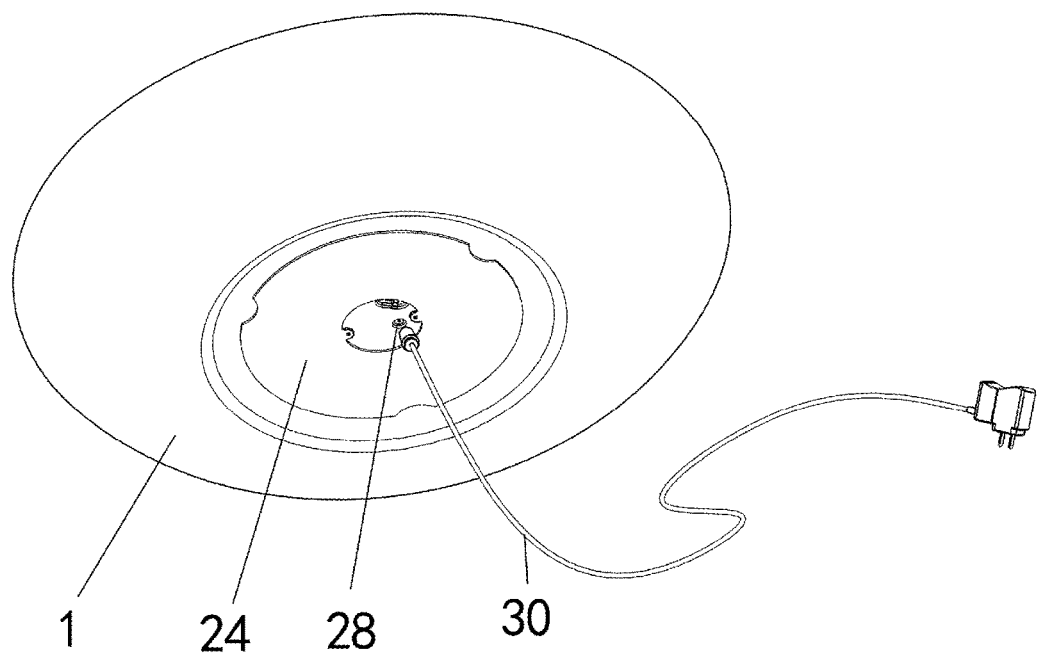
FIG. 2a is a bottom view 2 of the lighting apparatus of the present invention.
Figure 3:
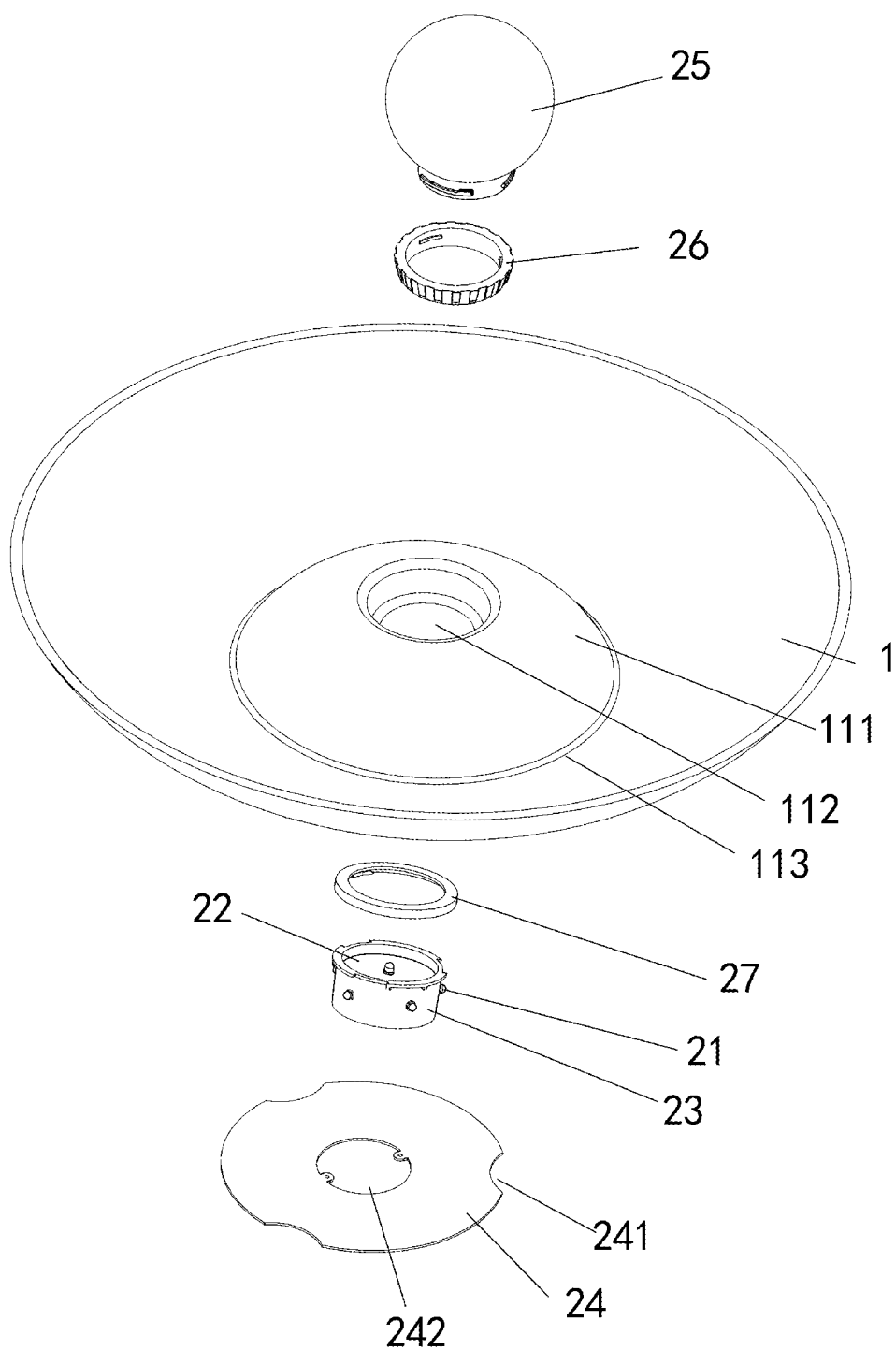
FIG. 3 is an exploded view of the lighting apparatus of the present invention.

The lighting assembly 12 also comprises a power provided inside or outside the body 1, or is provided on the mounting frame 112. The power can be in form of 110-240V Alternating Current, solar cell chip 22, battery cell, etc. If solar cell chip 22 is used, the solar cell chip 22 uses a solar-powered light-controlled switch to store energy in daytime and provide electric energy for the light-emitting body 21 in nighttime. If the power is provided outside the body 1, that is, when external power is used, as illustrated in FIG. 2a, an interface 28 can be provided on the mounting frame 23 to connect to the external power. The interface 28 can also be provided on the body 1, the chamber 11, the first luminous body 111 and/or the second luminous body 25. In addition, as illustrated in FIG. 2, the external power can also electrically connect to the luminous body 21 through a wire 30. One end of the wire 30 electrically connects to the light-emitting body 21 after passing through the through hole 29 on the light diffuser plate 24.

Figure 4:
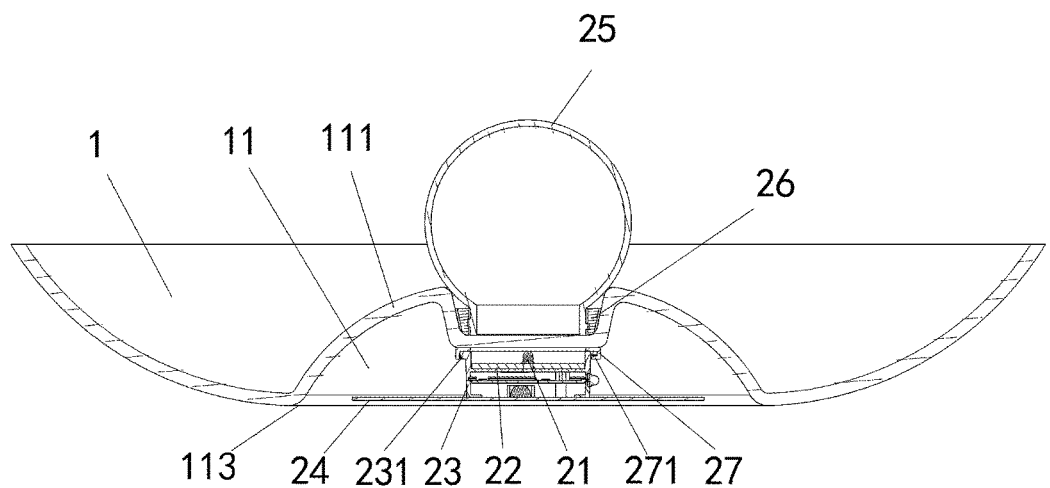
FIG. 4 is a cross-sectional assembly view of the lighting apparatus of the present invention.
Figure 4A:
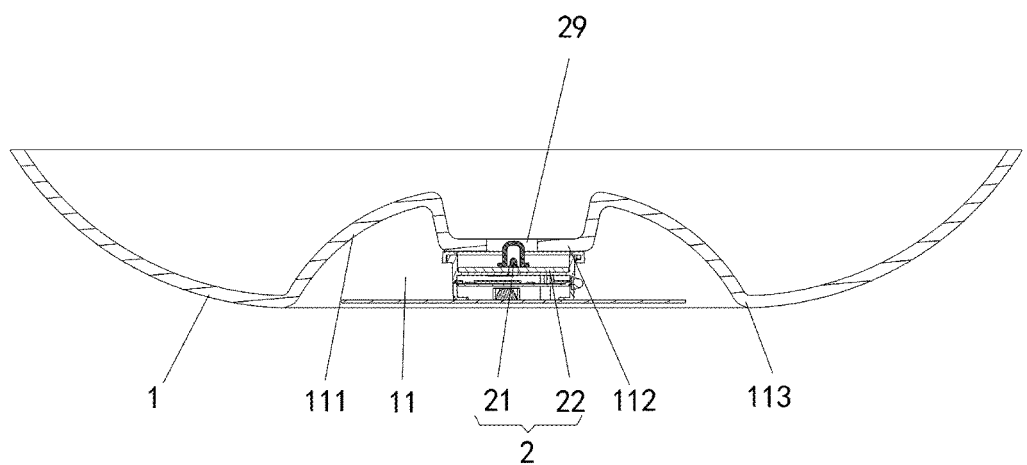
FIG. 4a is a schematic view showing the through hole of a mounting base.

Further, a through hole 29 can be provided on the body 1, the chamber 11, the mounting base 112, the mounting frame 23, the first luminous body 111 and/or the second luminous body 25. The wire 30 can pass through the through hole 29 and then connect to the luminous body 21. The through hole 29 can also serve as an access opening for inspecting and replacing the lighting assembly 2. The through hole 29 can also serve as a hollowed-out hole so that external light can directly pass through the through hole 29. Specifically as illustrated in FIG. 4a, the through hole 29 is provided on the mounting base 112 so that the luminous body 21 is located in the through hole 29. The light emitted from the luminous body 21 directly passes through the through hole 29, further enhancing the lighting brightness and illumination effects.

Further, the mounting frame 23 is mainly used for positioning the light-emitting body 21 and the solar cell chip 22 etc. The mounting frame 23 can be made into an annular shape. The light-emitting body 21 uses multiple lamp beads. The multiple lamp beads are monochromatic or multicolor respectively. The monochromatic or multicolor lamp beads are provided on one or more surfaces of the top, bottom and side of the mounting frame 23 respectively. Light of the lamp beads at the top surface is emitted upwards; light of the lamp beads on the side is emitted upwards or downwards.

Light of the lamp beads on the side can also be disposed in a slanting manner so that the light is emitted towards the first luminous body 111 and the light diffuser plate 24 as much as possible; light of the lamp beads at the bottom can also be emitted downwards or in a slanting manner. In addition, the light-emitting body 21 can be at least one LED lamp bead. The LED lamp bead is mounted on the side, top or bottom of the mounting frame 23. In addition, the light-emitting body 21 can also be provided outside the chamber 11, and/or inside and/or outside the body 1.

Further, the bottom of the chamber 11 is provided with a light diffuser plate 24. The light diffuser plate 24 causes the chamber 11 to be formed into a sealed or semi-sealed chamber. Alternatively, the bottom of the mounting frame 23 is provided with a light diffuser plate 24, so that the interior of the mounting frame 23 forms a sealed chamber with waterproof function. Thus, it is convenient to arrange components such as a circuit and solar cell chip 22 in the sealed chamber 11 or sealed mounting frame 23.

Further, a stand 113 for supporting the lighting apparatus is formed at the bottom of the body 1. A light diffuser plate 24 is assembled at the bottom of the mounting frame 23 in a removable manner. The light diffuser plate 24 is slightly higher than the stand 113 and located above the stand 113 as illustrated in FIG. 4. Thus, the stand 113 supports the lighting apparatus. When the lighting apparatus is placed flat on a table, it is stable and safe and does not wobble easily.

The light diffuser plate 24 is in a planar, ribbed or an arc shape or at least a plano-convex shape. If an arc-shaped plate is used, top surface of the light diffuser plate 24 faces the chamber 11. At least the top surface is a convex surface which concentrates light, that is, the light diffuser plate 24 at least is in a plano-convex shape. If a ribbed plate is used, arrangement of the ribbed surface is the same as previously mentioned. The light diffuser plate 24 can be made of conventional materials such as reflective plate, reflective sheeting, EPE foam or fluorescent material. Plastic sheeting such as optical grade PMMA/PC can also be used as backing materials. When diffusers are used in the backing materials, light refracts, reflects and scatters between chemical particles and resins continuously, thereby adjusting the direction of light transmission, so that the light diffuser plate has the effects of high transparency and good light dispersion. Specifically, surface of the light diffuser plate 24 is frosted to achieve a smooth effect. Not only is it aesthetically pleasing, it is wear-resistant, UV-resistant, has stable anti-scratch properties and good weather resistance.

Further, the lighting apparatus also comprises a second luminous body 25. The second luminous body 25 is made into a second translucent body with light-penetrative materials, and/or is made into a second refractive body with light-reflective materials. The following description mainly uses a second translucent body as an example for illustration. The second luminous body 25 is in a polyhedron shape or an atypical shape. A lampshade in a crystal-cut surface, curved surface or an atypical surface can be used. The second luminous body 25 is provided outside the chamber 11 corresponding to the light-emitting body 21 by means of a fastener or in a close-fitting manner. Thus, the LED lamp beads provided at the center of the top surface of the mounting frame 23 emit light which enters the second luminous body 25 after passing through the first luminous body 111. The light reaches all sides inside the basin of the body 1. Ultimately, the area, angle and brightness of illumination are increased. Also, the emitted light forms a soft and bright source of light, producing an effect of "seeing light without seeing lamp beads". All sides inside the body 1 are fully exposed to the light, so that there is neither shadow nor dark area throughout the entire body 1, achieving an effect which is gorgeous and perfectly clear and bright.

The sharp effect in the body 1 can be achieved by a variety of combinations of settings of the positions of LED lamp beads, illumination angles emitted from the LED lamp beads, the light diffuser plate 24 and second luminous body 25. Specifically:

1. When the LED lamp beads are provided on the top surface of the mounting frame 12, light of the LED lamp beads directly reaches the second luminous body 25 above, so that the periphery inside the body 1 is exposed to the light as much as possible.

2. When the LED lamp beads are provided on the side of the mounting frame 23, light of the LED lamp beads can directly reach the first luminous body 111 above, or reach the light diffuser plate 24 below. The light diffuser plate 24 further causes the light to emit through the first luminous body 111, so that the light concentrates on the first luminous body, thus increasing the brightness of the first luminous body 111, that is, increasing the brightness at the center of the bottom of the body 1.

3. The projected area of the first luminous body 111 accounts for 20-60% of the projected area of the body 1, preferably 30-40%. Not only can the first luminous body 111 at the center of the basin bottom be turned into a bright light package, but practical functions such as holding water and holding food are not affected. The projected area of the second luminous body 25 accounts for 10-60% of the projected area of the body 1, preferably 30-40% or 30-50%. The light emitted from the second luminous body 25 can not only brighten all sides inside the basin, but practical functions such as holding water and holding food are not affected. The ratio of the projected area of the second luminous body 25 to the projected area of the first luminous body 111 is 0.1-3, preferably 0.3-3.

By setting the LED lamp beads as above, the light emitted from the LED lamp beads is refracted, reflected and scattered in multiple angles and multiple directions. A more ideal light dispersion effect is achieved, producing a uniform lighting effect or a night view decorative effect.

Further, an outer surface of the first luminous body 111 of the chamber 11 is provided with a mounting base 112 for assembling a second luminous body 25. For example, the first luminous body 111 is recessed inwards to form the mounting base 112. A first connecting piece 26 is embedded tightly in the mounting base 112. The second luminous body 25 is assembled at the first connecting piece 26 through a fastener structure.

Further, the surface of the first luminous body 111 and/or the second luminous body 25 is hollowed out.

Further, the inner surface of the second luminous body 25 above and below the chamber 11 is scale-like, honeycomb-like or in a gemstone cut shape; or the inner surface of the second luminous body 25 below the chamber 11 is scale-like, honeycomb-like or in a gemstone cut shape. Thus, the second luminous body 25 can project a lighting effect similar to stage lights. It is not blinding but can improve the ambience. It can also produce a streetlamp lighting effect. When such light is emitted upwards, the angle and area of illumination can increase. When such light is emitted to the ground downwards, the degree of brightness is adequate. It is suitable for ground lighting use.

Embodiment 1

Figure 5:
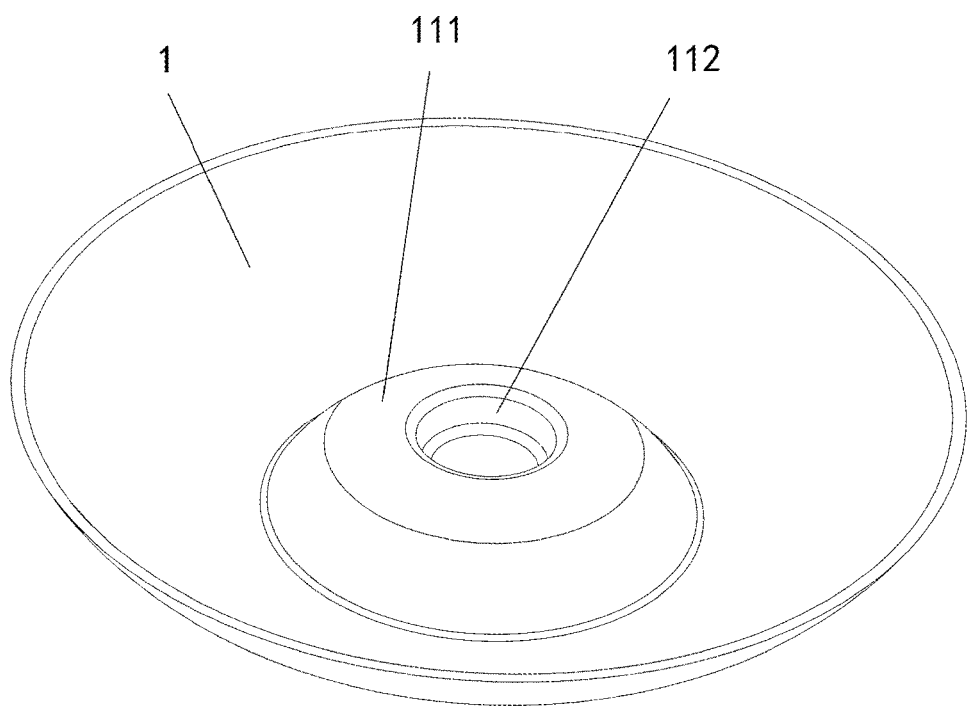
FIG. 5 is a horizontal fragmented view showing the first luminous body of the present invention.
Figure 6:
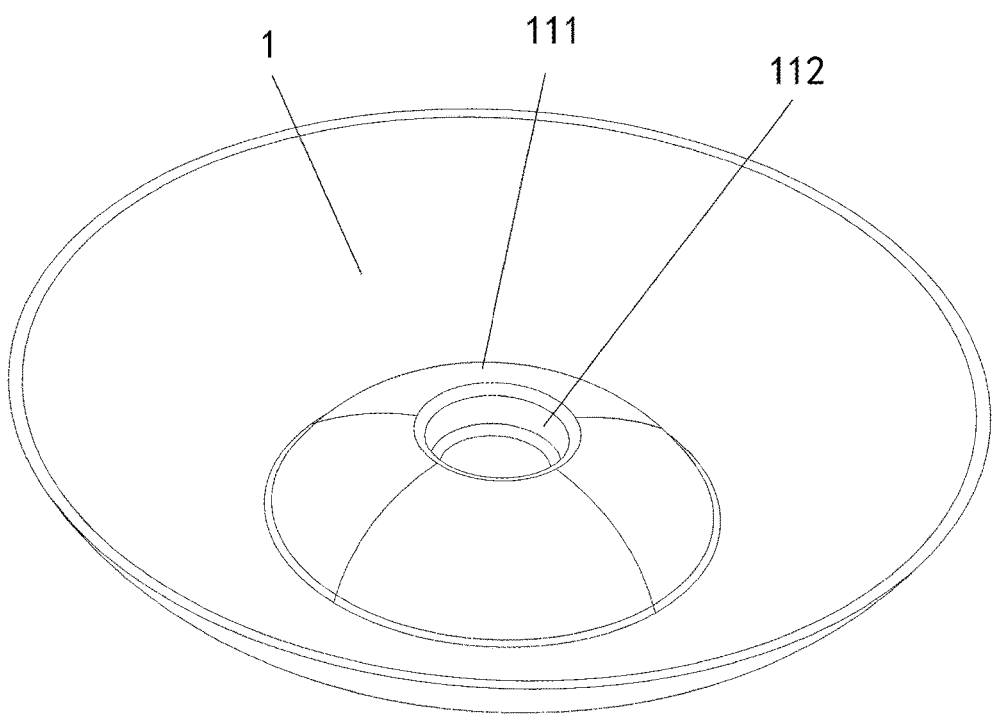
FIG. 6 is a vertical fragmented view showing the first luminous body of the present invention.
Figure 6A:
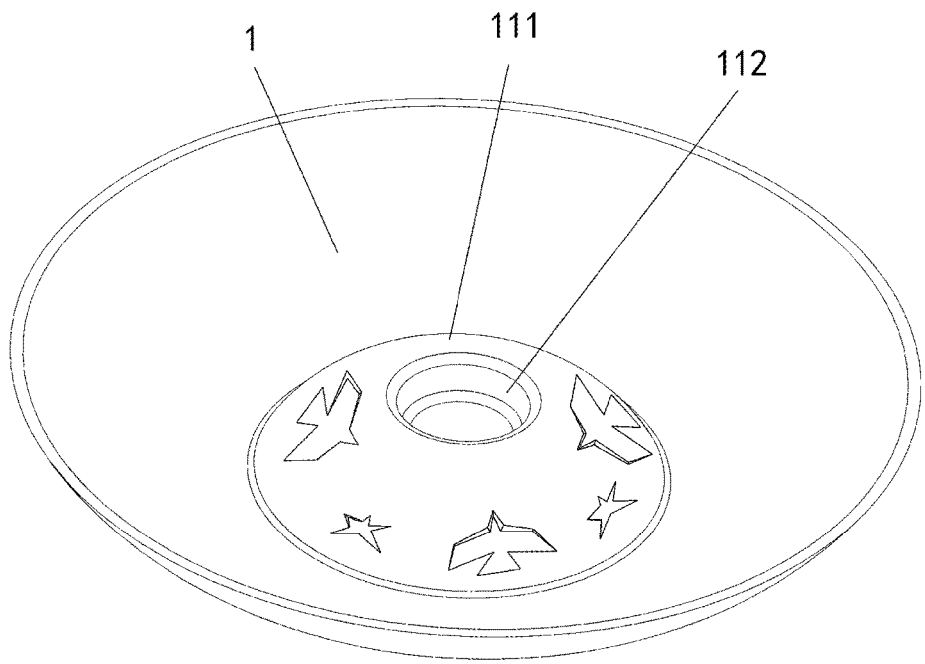
FIG. 6a is a schematic view showing a hollowed-out chamber wall of the chamber of the present invention.

The body 1 is made of glass, resin, metal, rubber, plastic, plastic material, ceramic, etc. It can be integrally molded or formed by combining or laminating the materials above. The body 1 in this embodiment is integrally molded into a basin shape by the use of transparent glass. A fish pattern is painted on the basin surface, or the entire body is integrally molded with a three-dimensional fish pattern. The basin bottom protrudes towards the basin interior to form a chamber 11. A chamber wall of the chamber 11 is provided with a protruding first luminous body 111. As illustrated in FIGS. 5 and 6, the first luminous body 111 can be divided into multiple pieces along a horizontal or vertical direction. The curvature and refractive index for each piece can vary, so that the light emitted from the first luminous body 111, the second luminous body 25 or the light diffuser plate 24 is more focus and concentrates on the basin bottom and all sides inside the basin, producing an effect which is perfectly clear and bright and gorgeous.

A mounting frame 23 is provided in the chamber 11. The mounting frame is in an annular shape. The top annular wall of the mounting frame 23 is bent outwards to form a flange 231. A second connecting piece 27 is adhered to the inner surface of the first luminous body 111. The outer edge of the second connecting piece 27 is bent downwards to form a flanged edge 271. At least part of the outer edge section is in U shape. The flange 231 of the mounting frame 23 and the flanged edge 271 cooperate with each other to form a rotatable fastening structure. Specifically: the flange 231 is placed in the flanged edge 271. When the mounting frame 23 rotates to a specific angle relative to the second connecting piece 27, the flange 231 is perfectly received inside the U-shape flanged edge 271.

Components such as an electrically connected solar cell chip 22 and circuit board are provided in the cavity formed by the annular wall of the mounting frame 23. Certainly, dry battery, storage battery, etc. can also be used as power. Lamp beads are electrically connected, which can produce light changes such as continuous lighting, color variation of lights and flashing. LED lamp beads are equally spaced in a circle and provided on the external annular wall. In two adjacent LED lamp beads, one LED lamp bead is provided in an upward slanting manner facing the first luminous body 111, the other LED lamp bead is provided in a downward slanting manner facing the light diffuser plate 24. Thus, light emitted from the LED lamp beads mostly concentrates in the basin, achieving a better light focusing effect. By arranging a LED lamp beads in the mounting frame 23 through a fixed plate or directly on the circuit board, the illuminating effect at the center of the mounting frame 23 is improved.

The bottom annular wall of the mounting frame 23 is provided with multiple screw holes for screw assembly. The light diffuser plate 24 seals the opening at the bottom of the mounting frame 23 through screws, so that the interior of the mounting frame 23 forms a sealed chamber. Components provided in such a sealed mounting frame 23 are free from water stain corrosion from outside, thereby avoiding the breakdown of circuit and components, extending the service life and enhancing safety.

The light diffuser plate 24 can also be mounted at the bottom of the mounting frame 23 in a removable manner through a rotatable fastening structure. The periphery of the light diffuser plate 24 is provided with a recess 241 which is easily accessible by hand. The light diffuser plate 24 can also be provided with an O-shape hole which is easily accessible by hand. The light diffuser plate 24 can be provided with an access port 242 as well. Thus, it is convenient to inspect and replace the solar cell chip 22 and battery provided on the mounting frame 23.

The first luminous body 111 of the chamber 11 is recessed inwards at around the center thereof to form a mounting base 112. A first connecting piece 26 is adhered to, embedded tightly or assembled in the mounting base 112. The annular wall of the first connecting piece 26 is opened with multiple fastening slots. The second luminous body 25 is spherical. The bottom of the second luminous body 25 is protrudingly disposed with multiple fastening blocks. The bottom of the second luminous body 25 is placed inside the first connecting piece 26. When the second luminous body 25 rotates to a specific angle relative to the first connecting piece 26, the fastening blocks are received in the fastening slots, causing the second luminous body 25 and the first connecting piece 26 to be fastened together and could not be disengaged.

When in use as illustrated in FIGS. 8-11, the lighting apparatus of the present invention is placed in an environment such as indoor and outdoor and courtyard. The bottom of the body 1 is provided with a pole, a supporting frame with multiple legs, or a hook. Alternatively, one or more hanging chains are hanged on the body 1. Thus, it can be used as inserted light, table-type bird bath, ground bird bath, hanging bird bath, ornamental pot, hanging planter, hanging basket, pendant light, bracket light, wall light etc. in courtyard. When it is used as an inserted light in courtyard, it is very convenient to insert directly in the ground. When it is used as a bracket light or wall light, the hollow out patterns, three-dimensional patterns or colored patterns on the body 1, the first luminous body 111 or the second luminous body 25 can all give a decorative effect in daytime. In nighttime, these patterns are projected onto the roof, wall or ground. A specific indoor scene can also be created by a combination of light and shadow changes. When it is used as a pendant light or hanging basket, the body 1 swings gently, and the light-emitting body 21 projects the hollow out pattern on the first luminous body 111 and the second luminous body 25 upwards and downwards. A special and fancy lighting effect can also be created, which is particularly suitable for indoor decoration.

Take a bird bath as example, when the body 1 is placed flat, water and bird food can be held in the basin. In daytime, LED lamp beads do not light up. Birds can clean their feathers and peck at the bird food in the basin, which is environmentally friendly and energy saving. In nighttime, LED lamp beads light up. The basin bottom and the periphery of the basin can produce a bright effect. Although the brightness is increased, the light is softer and focuses on the interior and the periphery of the basin without diffusing outwards to a large area outside the basin excessively. Thus, there is no light pollution. Also, a uniform lighting effect or a night view decorative effect can be achieved. The methods of use for other applications will not be repeated herein to avoid redundancy.

When the first luminous body 111, the second luminous body 25, the body 1 and the chamber wall of the chamber 2 are hollowed out, light passes through the hollowed-out holes and forms a variety of lighting effects according to the hollow out patterns. When the LED lamp beads or the chamber 11 rotate, such hollow out patterns produce a dazzling lighting effect with alternating light and shade variation.

Embodiment 2

Figure 7:
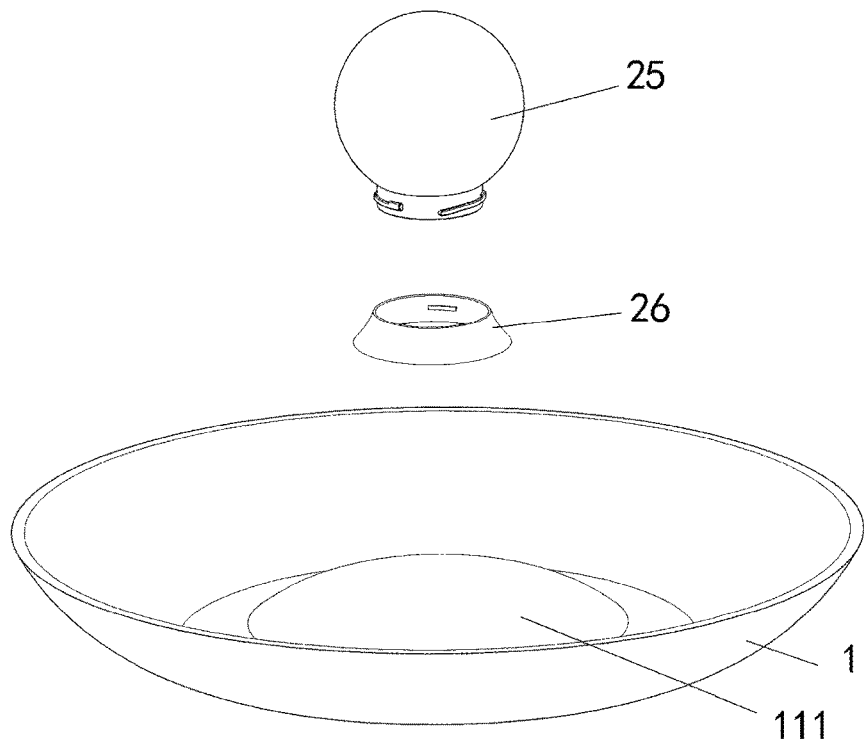
FIG. 7 is a schematic view showing the second luminous body above the chamber of the present invention using an external connecting piece.

As illustrated in FIGS. 4 and 7, the top of the chamber 11 connects to a second luminous body 25 through an external first connecting piece 26. The outer surface of the flange at the bottom of the second luminous body 25 is provided with an outer fastening edge. The first connecting piece 26 is in an annular shape, a stand shape or a platform shape. The inner surface of the first connecting piece 26 is provided with an inner slot. The inner slot and the outer fastening edge cooperate with each other to mount the second luminous body 25 at the body 1 in a removable manner.

Embodiment 3

Figure 7A:
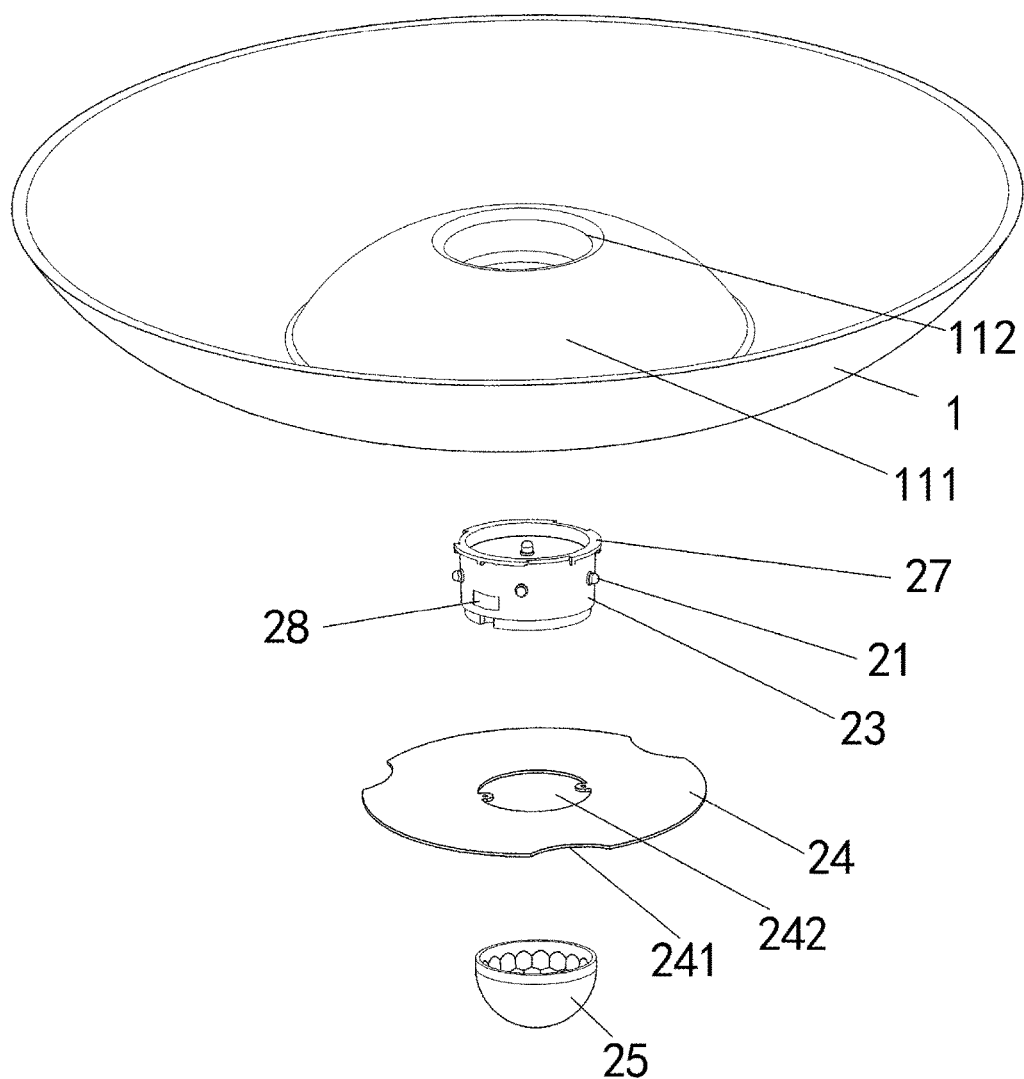
FIG. 7a is a schematic view showing the second luminous body provided below the chamber of the present invention.

As illustrated in FIG. 7a, a second luminous body 25 is connected below the mounting frame 23 in this embodiment. The lower end of the mounting frame 23 passes through the light diffuser plate 24. The light diffuser plate 24 is fixed on the mounting frame 23 by two screws. The outer surface of the lower end of the mounting frame 23 is also provided with an outer rotatable fastening projection. The inner edge of the second luminous body 25 is provided with an inner rotatable fastening recess. The outer rotatable fastening projection and the inner rotatable fastening recess cooperate with each other to mount the second luminous body 25 at the lower end of the mounting frame 23 in a removable manner by a rotatable fastening mechanism.

Embodiment 4

Figure 7B:
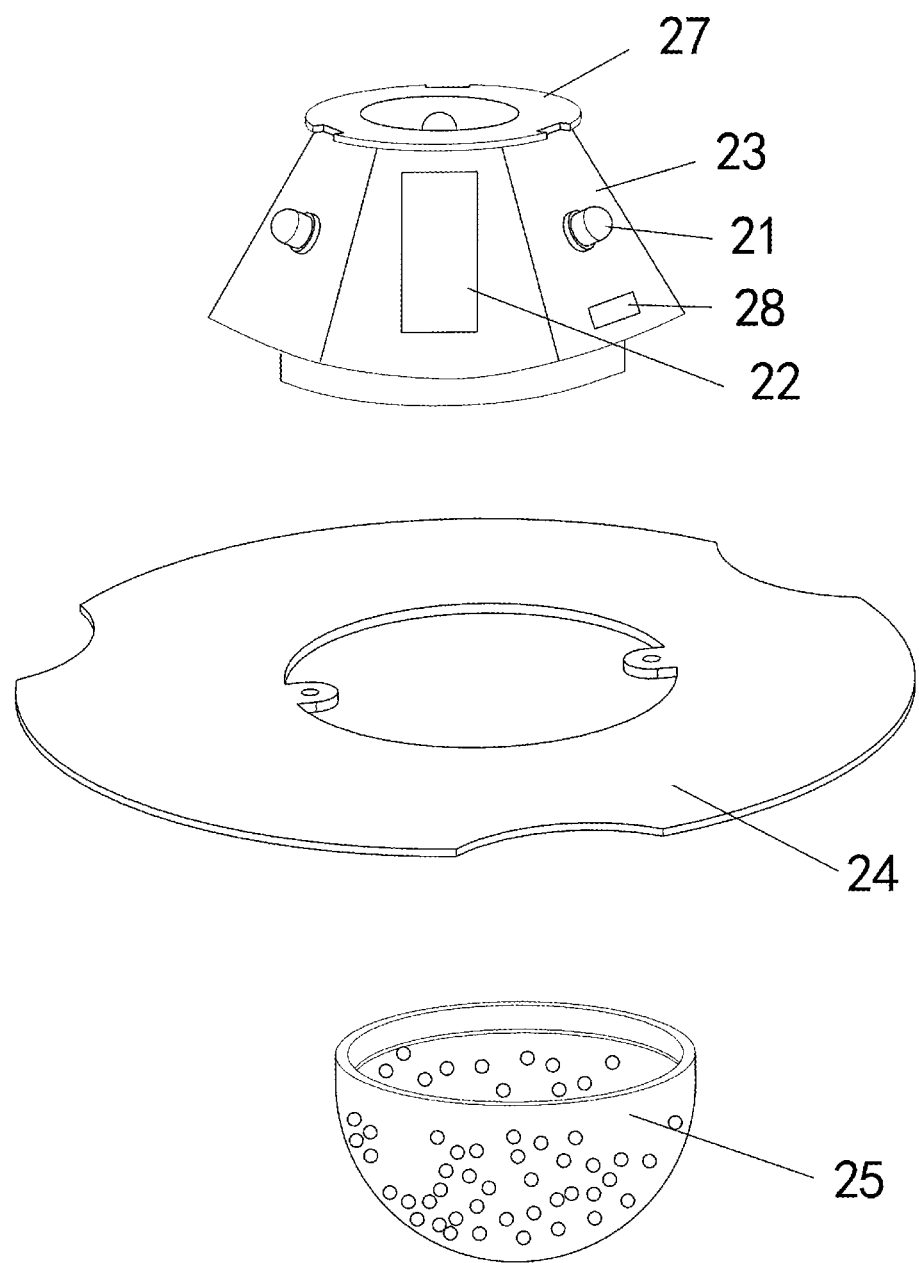
FIG. 7b is a schematic view showing solar cell chips provided on the side of a platform-shaped mounting frame of the present invention.

As illustrate in FIG. 7b, the mounting frame 12 in this embodiment is in shape of a multi-faced platform or a rounded platform with a side surface disposed with solar cell chips 22 and a light-emitting body 21 at intervals. Preferably, it is convenient for the solar cell chips 22 to be attached to the multi-faced platform, and the shape of the multi-faced platform with one large end and one small end is easily placed inside the bow-shaped chamber 1. Also, when the mounting frame 23 absorbs less solar energy on the body 1, the position and slanting angle of the solar cell chips 22 on the mounting frame 23 can be adjusted, so that multiple solar cell chips 22 on the mounting frame 23 can absorb solar energy anytime during daylight hours as much as possible.

Figure 7C:
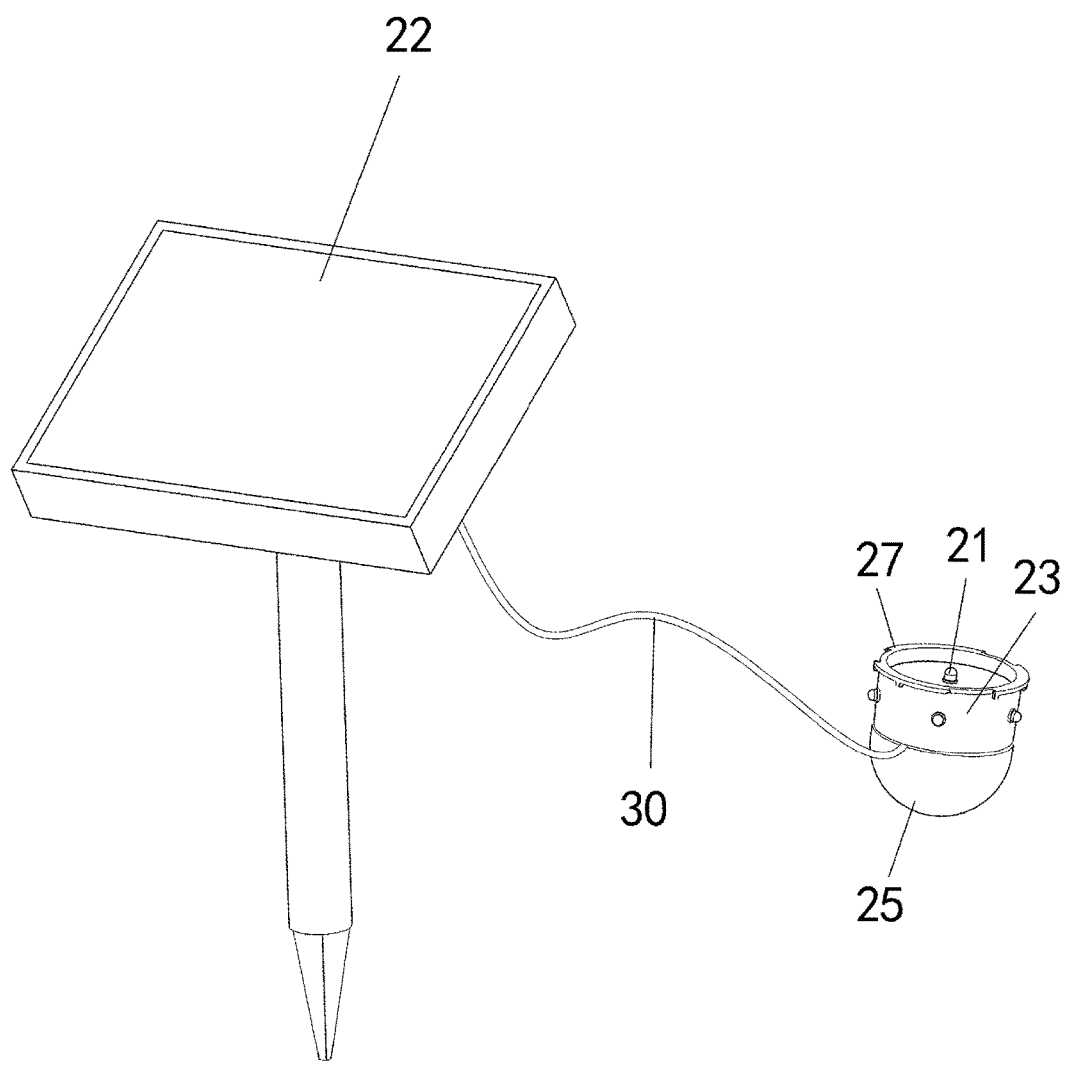
FIG. 7c is a schematic view showing a mounting frame connecting electrically to the external solar cell chip of the present invention.

As illustrated in FIG. 7c, the solar cell chip 22 can also be provided externally. It can be provided outside the body 1 or the mounting frame 23. When it is provided outside the body 1, by selecting the best location to place the solar cell chip 22, the solar cell chip 22 can absorb solar energy anytime during daylight hours as much as possible. Since the location where the solar cell chip 22 is placed is not limited by the shape and space of the body 1, the solar cell chip 22 is provided with flexibility, and the mounting frame 23 can be designed with ease.

Embodiment 5

Figure 7D:
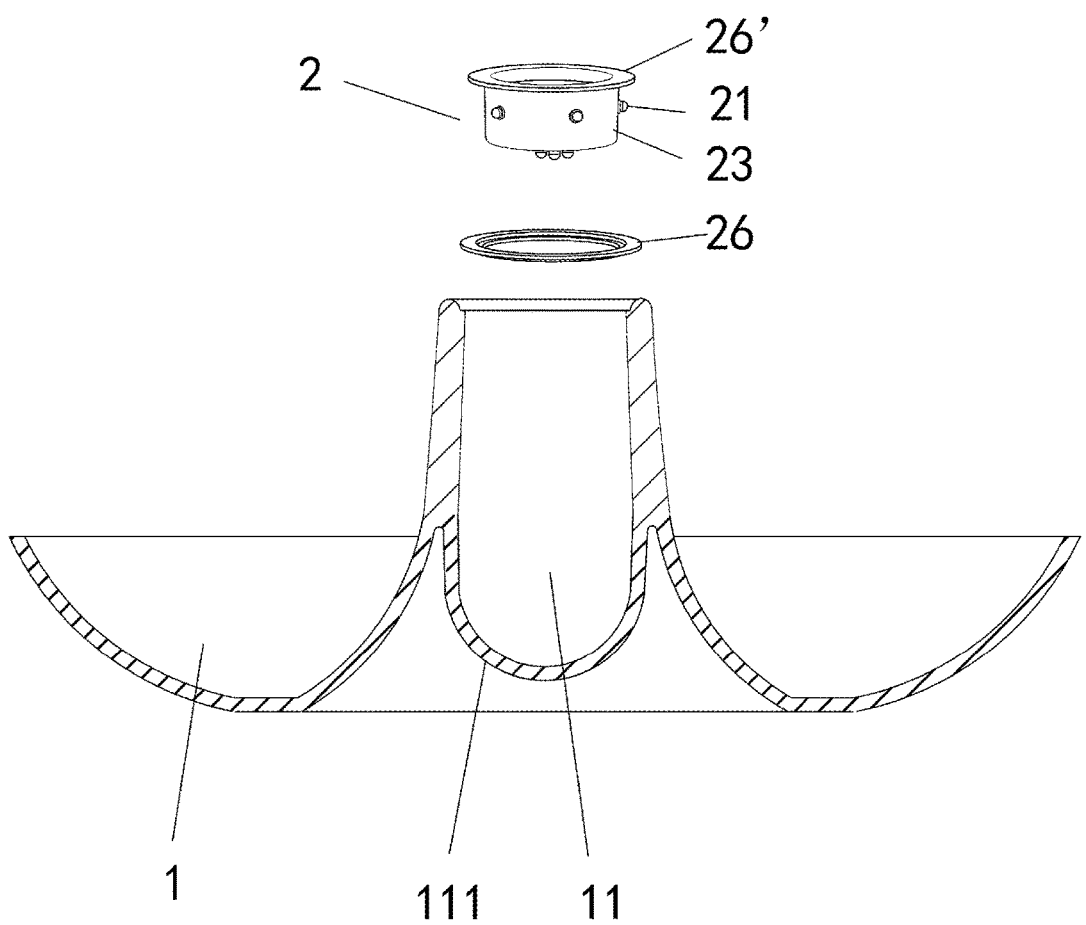
FIG. 7d is a schematic view showing a mounting frame being placed in the chamber on the body of the present invention.
Figure 8:
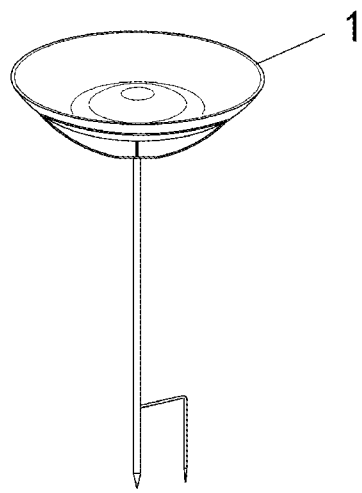
FIG. 8 is a schematic view showing the present invention being used as an inserted light in courtyard.
Figure 9:
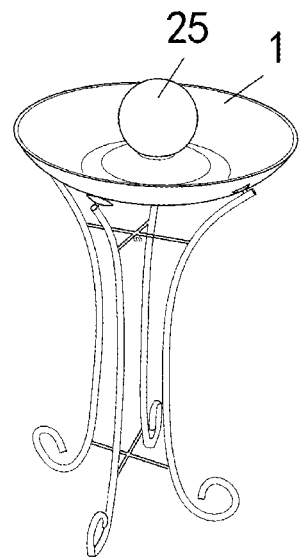
FIG. 9 is a schematic view showing the present invention being used as a bird bath or an ornamental pot.
Figure 10:
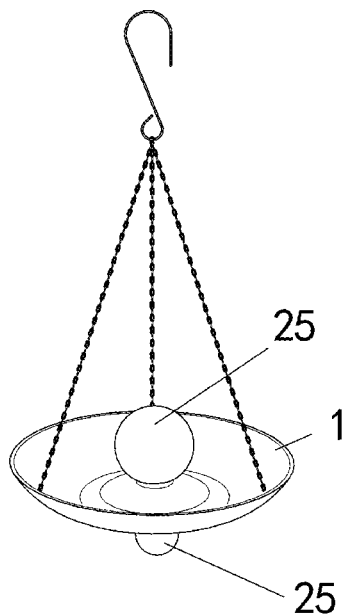
FIG. 10 is a schematic view showing the present invention being used as a hanging device of hanging planters, hanging baskets or pendant lights with multiple strings.
Figure 10A:
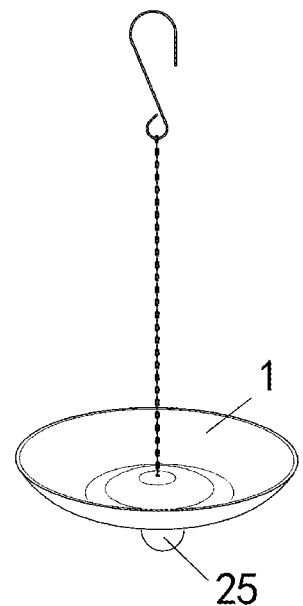
FIG. 10a is a schematic view showing the present invention being used as a hanging device of hanging planters, hanging baskets or pendant lights with single string.
Figure 11:
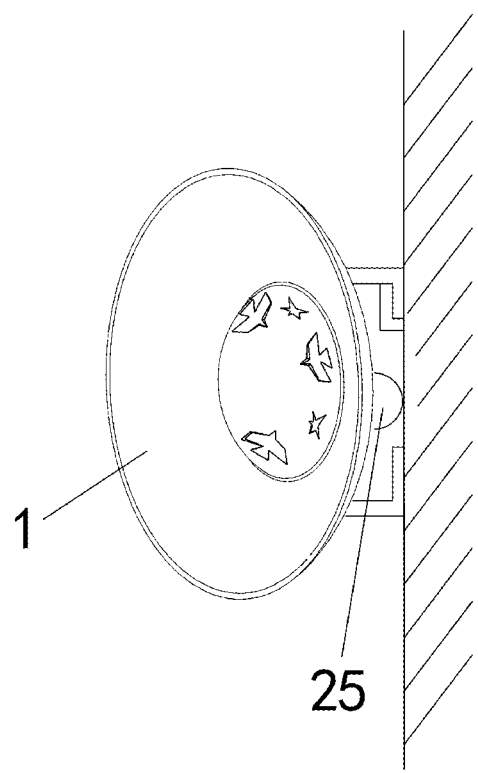
FIG. 11 is a schematic view showing the present invention being used as a bracket light or a wall light.

As illustrated in FIG. 7d, viewing from the top, the interior of the bottom of the body 1 is in a conical or cylindrical shape, forming the chamber 11 above. Also, the top edge of the lateral chamber wall is higher than the top edge of the body 1. The bottom chamber wall of the chamber 11 protrudes towards the bottom to form an arc shaped first luminous body 111. The edge of the opening of the chamber 11 is tapered and adhered with a first connecting piece 26. One end of the mounting frame 23 is provided with another first connecting piece 26'. The first connecting piece 26 and the first connecting piece 26' fasten with each other to assemble the lighting assembly 2 in the chamber 11 above. As for the chamber 11 in FIG. 4, the chamber 11 below is formed by the bottom of the body 1 protruding inwards.

When the light-emitting body 21 is placed in the chamber 11 above, the light-emitting body 21 is roughly provided at a position higher than the top edge of the body 1. Thus, light emitted from the light-emitting body 21 can pass through the lateral chamber wall of the chamber 11 to brighten the body 1.

The foregoing embodiments and drawings do not limit the product form and style of the present invention. All suitable modifications and equivalents made by those skilled in the art may be resorted to falling within the scope of the invention.

What is claimed is:

1. A lighting apparatus comprising a body and a lighting assembly; the lighting assembly comprises a mounting frame and a light-emitting body; the light-emitting body is provided on the mounting frame; characterized in that the body is in a polyhedron shape; a surface of the body protrudes or is recessed to form a chamber; the light-emitting body is provided inside and/or outside the chamber, and/or inside and/or outside the body; a bottom of the body protrudes or is recessed to form the chamber; at least part of a chamber wall of the chamber forms a first luminous body which is light reflective or light refractive; the first luminous body is in a polyhedron shape; the first luminous body is made into a first translucent body with light-penetrative materials, or is made into a first refractive body with light-reflective materials; the lighting apparatus also comprises a second luminous body; the second luminous body is in a polyhedron shape; the second luminous body is provided outside the chamber corresponding to the light-emitting body; the second luminous body is made into a second translucent body with light-penetrative materials, or is made into a second refractive body with light-reflective materials.

2. The lighting apparatus as in claim 1, which is characterized in that the light-emitting body comprises multiple lamp beads; the multiple lamp beads are monochromatic or multicolor respectively; the lamp beads are provided inside, on a side of, above and/or below the mounting frame respectively; light of the lamp beads at a top surface is emitted upwards; light of the lamp beads on the side is emitted upwards or downwards; light of the lamp beads at a bottom surface is emitted downwards.

3. The lighting apparatus as in claim 1, which is characterized in that a stand for supporting the lighting apparatus is formed at a bottom of the body; a bottom of the mounting frame is provided with a planar, ribbed or an arc shaped light diffuser plate, which is higher than the stand.

4. The lighting apparatus as in claim 1, which is characterized in that the chamber wall of the chamber is recessed to form a mounting base; the second luminous body is provided on the mounting base in a removable or fixed manner; or the second luminous body is provided above and/or below the chamber in a removable or fixed manner; or a through hole is provided on the body, the chamber, the mounting base, the first luminous body and/or the second luminous body.

5. The lighting apparatus as in claim 4, which is characterized in that a ratio of a projected area of the first luminous body to a projected area of the body is 0.2-0.6; and/or a ratio of a projected area of the second luminous body to the projected area of the body is 0.1-0.6; and/or a ratio of the projected area of the second luminous body to the projected area of the first luminous body is 0.1-3.

6. The lighting apparatus as in claim 4, which is characterized in that the lighting apparatus also comprises a power which provides electricity for the luminous body; the power is provided inside or outside the body, or is provided on the mounting frame; the power electrically connects to the luminous body through an interface, or electrically connects to the luminous body by a wire which passes through the through hole.

7. The lighting apparatus as in claim 1, which is characterized in that the lighting apparatus also comprises a solar cell chip which provides electricity for the luminous body; the solar cell chip is provided inside or outside the body, or is provided at a top surface, on a side and/or at a bottom of the mounting frame; or the solar cell chip and the luminous body are spaced at intervals and provided on the mounting frame.

8. The lighting apparatus as in claim 1, which is characterized in that an inner surface of the first luminous body and/or the second luminous body is scale-like, honeycomb-like or in a gemstone cut shape; or a surface of the first luminous body and/or the second luminous body is hollowed out; or the first luminous body and/or the second luminous body has one or more than two refractive indices.

* * * * *